May 1, 1934.                    W. C. HARRIS                    1,957,208
                                ELECTRIC DRIVE
                              Filed May 10, 1932
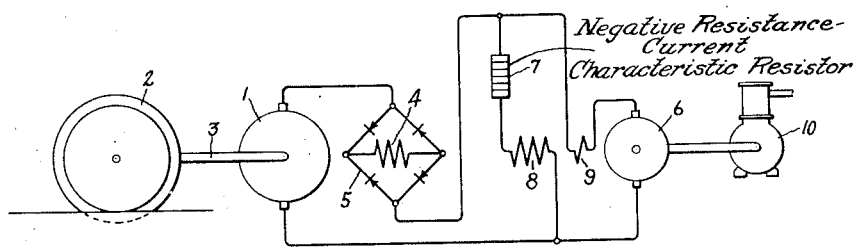
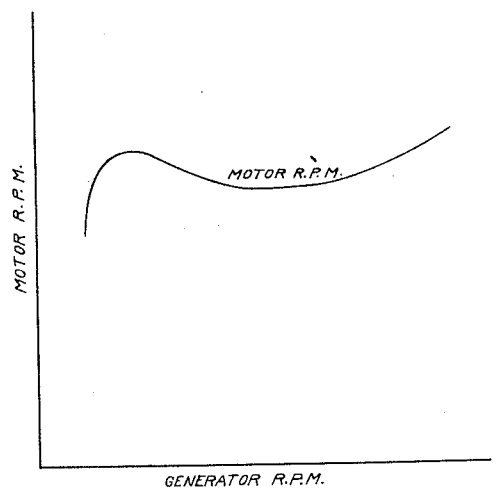
Inventor:
Walter C. Harris
by *(signature)*
His Attorney.

Patented May 1, 1934

1,957,208

UNITED STATES PATENT OFFICE 1,957,208

ELECTRIC DRIVE

Walter C. Harris, Erie, Pa., assignor to General Electric Company, a corporation of New York Application May 10, 1932, Serial No. 610,393

10 Claims. (Cl. 171—313)

My invention relates broadly to electric drives and more particularly to an electrical system for driving a mechanical load at substantially constant speed from a source of mechanical rotation whose speed is widely variable.

There are numerous situations where it is desirable to operate a mechanical load device at substantially constant speed and the only convenient source of energy for operating this load device is a source of mechanical rotation whose speed is widely variable. For example, in refrigerator type railway freight cars, or in gasoline engine driven refrigerator trucks, it is often necessary to have a pump, or compressor, in cases where mechanical refrigeration is employed, and with any kind of refrigeration it is often desirable to provide fans, or blowers, for circulating the air in the refrigerated compartment so as to prevent temperature stratification. For best operation, the compressor, pump or fan should operate at a reasonably constant speed throughout a wide range of operating speed of the car or truck. In the case of freight cars the normal range of speed extends from fifteen miles an hour to approximately seventy-five miles an hour. This corresponds to the unusually wide speed ratio of 1:5.

Of the possible drives for such service, an electric drive employing a generator and a motor is generally considered preferable to a mechanical drive. However, even in the electric drive numerous problems arise. Thus, the wide range of operating speed of the prime mover would ordinarily result in such a wide range of generator voltage as to be prohibitive. It is, of course, possible to regulate the voltage of the generator by various arrangements both mechanical and electrical, but such arrangements add to the cost and complexity of the system. In addition, even if the range of unregulated voltage was not in itself prohibitive, it would normally tend to produce too great a variation in motor speed and consequently in the speed of the load. The result is that, for this class of service, an ordinary electric generator connected to the primary source of rotation and connected to drive an ordinary electric motor which in turn operates the load device, will not produce satisfactory operation over the entire range of speed of the primary source of rotation.

In accordance with a preferred embodiment of my invention, I provide a novel type of electric drive consisting of a series generator which is driven from the source of primary rotation and which is connected electrically to a motor which tends to operate at substantially constant speed over a given range of applied voltage. The motor is connected to drive a substantially constant load, although some variation in load is permissible. With this combination of generator and motor the following interaction takes place. Due to the fact that the motor tends to operate at substantially constant speed for a given range of applied volage it follows that, when substantially constant load is applied to the motor, the motor current must change substantially inversely with change in applied voltage. Consequently, when such a motor is driven by a series generator and the speed of the generator increases, the increase in generated voltage will result in a decrease in current and this decrease in current will reduce the excitation of the generator so as to limit its rise in voltage. The result of such interaction of the generator and motor is that even though the motor has substantially constant speed characteristics over only a limited range of applied voltage such a limited range of voltage will not be exceeded by an unusually wide range of generator speed.

Such an arrangement has the advantage of extreme simplicity and ruggedness of construction.

An object of my invention is to provide a new and improved electric drive.

A further object of my invention is to provide a simple and reliable electric drive between a source of primary rotation having a widely variable speed and a load which it is desired to operate at substantially constant speed.

My invention will be better understood from the following description taken in connection with the accompanying drawing and its scope will be pointed out in the appended claims.

In the drawing Fig. 1 illustrates diagrammatically a specific embodiment of my invention, while Fig. 2 is a curve showing an operating characteristic of my invention.

In Fig. 1 of the accompanying drawing, 1 is the armature of a direct current series generator which is adapted to be driven at widely varying speeds by any suitable means such, for example, as a railway car wheel 2. Armature 1 may be coupled to wheel 2 in any well known manner and for the sake of simplicity it is shown directly connected thereto by means of an axle 3. Generator 1 has a series field winding 4 which may be connected directly in circuit with the motor but which I have shown connected in circuit with the motor through a Wheatstone bridge connection of four unidirectional current conducting devices, or half wave rectifiers, 5. The purpose of this connection is to insure that the generator will always build up voltage regardless of its direction of rotation and it will be seen that with the connection shown the current through the series field winding 4 must always be in the same direction regardless of the polarity of the armature 1. It should be understood, however, that this arrangement is merely one of a large number of alternative ways for insuring build up of the generator and that I may use any of the well known arrangements for securing this result such, for example, as mechanical means for insuring the same direction of armature rotation regardless of the direction of rotation of the primary source, or friction operated brush shifting yokes on the series generator armature, or any other well known equivalent arrangement. The rectifying devices 5 may be any well known type, such for example, as the well known copper oxide type. Generator 1 is preferably operated throughout its normal range in an unsaturated condition so that its terminal voltage may be sensitive to changes in its excitation.

Connected to be operated by generator 1 is a motor 6, which in its simplest form may be a simple shunt wound direct current motor, which is preferably of such size and has such characteristics as to operate in an unsaturated condition over a given range of voltage applied to it. Such a motor inherently tends to operate at substantially constant speed, for a given load applied thereto, over the given range of applied voltage. This is because before saturation of the magnetic circuit of the motor occurs, its flux bears a substantially linear relation to its applied voltage and consequently as the voltage goes up the flux increases, thereby increasing the counter-electromotive force of the motor in substantially the same proportion as the applied voltage increases and thereby obviating any necessity for the motor to change its speed. It should be understood that this explanation is only approximate and that changes in armature reaction and armature resistance drop will introduce some error.

I prefer, however, to use a motor having special means for compensating for the effect of saturation therein so that this motor tends to operate at substantially constant speed over a range of applied voltage which is so great that magnetic saturation takes place. This motor has a negative resistance-current characteristic resistance element connected in series with its shunt field winding. Such a resistance element has the property of reducing its electrical resistance with increases in current therethrough and by properly proportioning and constructing this resistance it is possible to have the shunt field current increased disproportionately with the applied voltage in such a manner that the flux in the motor may be made substantially directly proportional to the applied voltage even though per cent magnetic saturation in the motor is relatively high.

In the drawing I have shown this special resistance material at 7 connected in series with a shunt field winding 8 for the motor 6. The particular negative resistance-current characteristic resistance which it is preferred to use is disclosed and claimed in Patent No. 1,822,742, granted September 8, 1931, on an application of K. B. McEachron and assigned to the assignee of the present application. This material has the property of reducing its electrical resistance instantaneously and in an exponential manner with increases in current density therethrough, and this action is substantially independent of temperature variations in the material.

I also prefer to provide motor 6 with a relatively weak series field winding 9 in order to protect this motor from injury when it is started and when the generator is operating at relatively low speed. The operation of this series field winding will be explained in connection with the description of the operation of my arrangement.

It will thus be seen that motor 6 is a special compound wound direct current motor having a predominating shunt field and a relatively weak series field.

Any suitable load device such, for example, as a refrigerator compressor 10 is connected to be operated by motor 6.

The operation of the arrangement shown in Fig. 1 is as follows: Assume that the primary source of rotation, namely the driving wheel 2, is starting to increase its speed from rest. As soon as wheel 2 starts to turn generator 1 will start to build up, due to its residual magnetism, and as the resistance of the circuit including the armature of the motor 6 and its series field winding 9 is relatively low, a relatively high current will flow, thereby increasing the excitation and consequently the voltage of series generator 1. If series field winding 9 were not present, and if operation were continued at such low speed, the heavy current and high voltage produced by the series generator 1 would be likely to injure, or even burn out, the motor 6 because of the fact that the armature in effect is short-circuiting the shunt winding and thereby preventing the motor from starting to turn. However, the series field winding 9 provides the necessary flux for causing this motor to turn over and build up its counter-electromotive force. This is the primary purpose of series winding 9, that is to say, it is provided merely for getting the motor 6 to turn over and thereby to limit the current through it. After motor 6 starts to run, and its counter-electromotive force has built up, the shunt field winding 8 will gradually increase its effect until at nearly full speed it predominates in producing the excitation of motor 6. At the same time, as soon as the counter-electromotive force of motor 6 becomes appreciable, the current through the series generator decreases thereby acting to decrease the voltage of this machine. At a given speed, say for example, a speed of wheel 2 corresponding to a speed of 15 miles per hour of a freight car, a condition of equilibrium will be attained at which motor 6 will be operating at a substantially normal speed and at its substantially normal output. If now the speed of wheel 2 and consequently the speed of generator 1 increases, its voltage will of course increase and, due to the substantially constant speed characteristics of motor 6, the current in the series circuit including the motor 1 must decrease and this tends to reduce, or check, the rise in voltage of generator 1 produced by its increase in speed. In this manner it is possible to obtain reliable operation over an extremely wide range of generator speed. It will also be seen that this operation over the wide range of speed of the primary source of rotation is made possible by means of the interaction on each other of the generator and the motor, both of which have particular characteristics. Broadly speaking, these characteristics are such that the generator's voltage increases with increases in its speed and decreases with decreases in its current while the motor's speed remains substantially constant over a given range of applied voltage.

In Fig. 2 is shown an operating characteristic curve of generator speed plotted against motor speed. From this curve it will be seen that over a ratio of generator speed of approximately 1:5 the motor speed only varies a few per cent, plus or minus, from its average speed over this range. The drop in speed beyond the hump at the left-hand end of the curve shows how the series winding on the motor acts to hold the speed down at low generator speed.

While I have shown and described a particular embodiment of my invention, it will be obvious to those skilled in the art that changes and modifications may be made and I, therefore, aim in the appended claims to cover all such changes and modifications as fall within the true spirit and scope of my invention.

What I claim as new and desire to secure by Letters Patent of the United States is:

1. In combination, a dynamo-electric generator whose voltage increases with increases in its speed and decreases with decreases in its current, and an electrical load whose current decreases with increases in its applied voltage connected to be energized by said generator.

2. In combination, a direct current series generator, and an electrical load device whose load value is substantially independent of applied voltage connected to said generator.

3. In combination, a direct current series generator which is adapted to be operated in an unsaturated condition over a relatively wide speed range, and an electrical power consuming device whose current varies substantially inversely with its applied voltage connected to said generator.

4. In combination, a normally unsaturated series wound direct current generator which is adapted to be operated at variable speed, and a normally unsaturated compound wound direct current motor connected to be energized by said generator.

5. In combination, a source of variable speed rotation, a series connected direct current generator operated from said source, a direct current motor whose speed is substantially independent of applied voltage connected to be energized from said generator, and a substantially constant mechanical load connected to said motor.

6. In combination, a dynamo-electric generator whose voltage increases with increases in its speed and decreases with decreases in its current, and a motor with a normally predominating shunt field winding connected to be energized by said generator.

7. In combination, a source of relatively widely variable speed rotation, a rotatable mechanical load device adapted to be driven at a relatively constant speed, and an electric drive interposed between said source and said load, said drive comprising a direct current series generator driven by said source and a direct current motor energized by said generator and coupled to drive said load, said motor having substantially the characteristics of a shunt motor during normal operation.

8. An electric drive for use between a source of relatively widely variable speed rotation and a mechanical load which is adapted to be driven at relatively constant speed comprising, in combination, a series connected generator driven by said source, and a motor whose speed is substantially independent of its applied voltage connected to be energized by said generator and coupled to drive said load.

9. In combination, a variable speed driven direct current series generator, a direct current motor connected to be energized by said generator, a shunt field winding for said motor, and a negative resistance current characteristic resistance connected in series with said shunt field winding.

10. In combination, an axle driven direct current series generator, a rectifier bridge connecting the series field winding of said generator to the armature thereof, a direct current motor connected to be energized by said generator, said motor having a relatively weak series field winding and a relatively strong shunt field winding, and a negative resistance current characteristic resistance connected in series with said shunt field winding.

WALTER C. HARRIS.